United States Patent
Chia et al.

(10) Patent No.: US 9,153,266 B1
(45) Date of Patent: Oct. 6, 2015

(54) DATA STORAGE DEVICE MEASURING LASER PROTRUSION FLY HEIGHT PROFILE

(71) Applicant: Western Digital Technologies, Inc., Irvine, CA (US)

(72) Inventors: Galvin T. Chia, Rancho Santa Margarita, CA (US); Davide Giovenzana, Longmont, CO (US); Teik Ee Yeo, Trabuco Canyon, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/483,397

(22) Filed: Sep. 11, 2014

(51) Int. Cl.
  *G11B 21/02* (2006.01)
  *G11B 5/02* (2006.01)
  *G11B 5/60* (2006.01)
  *G11B 11/105* (2006.01)
  *G11B 5/00* (2006.01)

(52) U.S. Cl.
  CPC ........ *G11B 5/6052* (2013.01); *G11B 11/10515* (2013.01); *G11B 2005/0021* (2013.01)

(58) Field of Classification Search
  None
  See application file for complete search history.

(56) References Cited

U.S. PATENT DOCUMENTS

| | | | |
|---|---|---|---|
| 4,913,547 A | 4/1990 | Moran | |
| 5,805,284 A | 9/1998 | Lacey | |
| 5,949,546 A | 9/1999 | Lee et al. | |
| 6,018,789 A | 1/2000 | Sokolov et al. | |
| 6,065,095 A | 5/2000 | Sokolov et al. | |
| 6,078,452 A | 6/2000 | Kittilson et al. | |
| 6,081,447 A | 6/2000 | Lofgren et al. | |
| 6,092,149 A | 7/2000 | Hicken et al. | |
| 6,092,150 A | 7/2000 | Sokolov et al. | |
| 6,094,707 A | 7/2000 | Sokolov et al. | |
| 6,105,104 A | 8/2000 | Guttmann et al. | |
| 6,111,717 A | 8/2000 | Cloke et al. | |
| 6,145,052 A | 11/2000 | Howe et al. | |
| 6,175,893 B1 | 1/2001 | D'Souza et al. | |
| 6,178,056 B1 | 1/2001 | Cloke et al. | |
| 6,191,909 B1 | 2/2001 | Cloke et al. | |
| 6,195,218 B1 | 2/2001 | Guttmann et al. | |
| 6,205,494 B1 | 3/2001 | Williams | |
| 6,208,477 B1 | 3/2001 | Cloke et al. | |
| 6,223,303 B1 | 4/2001 | Billings et al. | |
| 6,230,233 B1 | 5/2001 | Lofgren et al. | |
| 6,246,346 B1 | 6/2001 | Cloke et al. | |
| 6,249,393 B1 | 6/2001 | Billings et al. | |

(Continued)

OTHER PUBLICATIONS

Kurita, M., et al., "Flying-Height Reduction of Magnetic Head Slider Due to Thermal Protrusion," Magnetics Conference 2005, INTERMAG Asia 2005, Digests of the IEEE International, Publication Year: 2005, pp. 1401-1402.

(Continued)

*Primary Examiner* — Andrew L Sniezek (57) ABSTRACT

A data storage device is disclosed comprising a disk comprising a plurality of tracks, where each track comprises a plurality of servo sectors and at least one data segment between consecutive servo sectors. The data storage device further comprises a head actuated over the disk, the head comprising a laser configured to heat the disk during write operations based on a laser power. During a first revolution of the disk, the laser power is first increased over a first interval to cause at least part of the head to protrude toward a first data segment of the disk. After the first interval, the laser power is decreased and a fly height pattern is read from the first data segment to first measure a fly height of the head.

20 Claims, 5 Drawing Sheets

(56) References Cited

U.S. PATENT DOCUMENTS

| | | |
|---|---|---|
| 6,256,695 B1 | 7/2001 | Williams |
| 6,262,857 B1 | 7/2001 | Hull et al. |
| 6,263,459 B1 | 7/2001 | Schibilla |
| 6,272,694 B1 | 8/2001 | Weaver et al. |
| 6,278,568 B1 | 8/2001 | Cloke et al. |
| 6,279,089 B1 | 8/2001 | Schibilla et al. |
| 6,289,484 B1 | 9/2001 | Rothberg et al. |
| 6,292,912 B1 | 9/2001 | Cloke et al. |
| 6,310,740 B1 | 10/2001 | Dunbar et al. |
| 6,317,850 B1 | 11/2001 | Rothberg |
| 6,327,106 B1 | 12/2001 | Rothberg |
| 6,337,778 B1 | 1/2002 | Gagne |
| 6,369,969 B1 | 4/2002 | Christiansen et al. |
| 6,384,999 B1 | 5/2002 | Schibilla |
| 6,388,833 B1 | 5/2002 | Golowka et al. |
| 6,405,342 B1 | 6/2002 | Lee |
| 6,408,357 B1 | 6/2002 | Hanmann et al. |
| 6,408,406 B1 | 6/2002 | Parris |
| 6,411,452 B1 | 6/2002 | Cloke |
| 6,411,458 B1 | 6/2002 | Billings et al. |
| 6,412,083 B1 | 6/2002 | Rothberg et al. |
| 6,415,349 B1 | 7/2002 | Hull et al. |
| 6,417,981 B1 | 7/2002 | Smith |
| 6,425,128 B1 | 7/2002 | Krapf et al. |
| 6,441,981 B1 | 8/2002 | Cloke et al. |
| 6,442,328 B1 | 8/2002 | Elliott et al. |
| 6,445,524 B1 | 9/2002 | Nazarian et al. |
| 6,449,767 B1 | 9/2002 | Krapf et al. |
| 6,453,115 B1 | 9/2002 | Boyle |
| 6,470,420 B1 | 10/2002 | Hospodor |
| 6,480,020 B1 | 11/2002 | Jung et al. |
| 6,480,349 B1 | 11/2002 | Kim et al. |
| 6,480,932 B1 | 11/2002 | Vallis et al. |
| 6,483,986 B1 | 11/2002 | Krapf |
| 6,487,032 B1 | 11/2002 | Cloke et al. |
| 6,490,635 B1 | 12/2002 | Holmes |
| 6,493,173 B1 | 12/2002 | Kim et al. |
| 6,499,083 B1 | 12/2002 | Hamlin |
| 6,519,104 B1 | 2/2003 | Cloke et al. |
| 6,525,892 B1 | 2/2003 | Dunbar et al. |
| 6,545,830 B1 | 4/2003 | Briggs et al. |
| 6,546,489 B1 | 4/2003 | Frank, Jr. et al. |
| 6,550,021 B1 | 4/2003 | Dalphy et al. |
| 6,552,880 B1 | 4/2003 | Dunbar et al. |
| 6,553,457 B1 | 4/2003 | Wilkins et al. |
| 6,578,106 B1 | 6/2003 | Price |
| 6,580,573 B1 | 6/2003 | Hull et al. |
| 6,594,183 B1 | 7/2003 | Lofgren et al. |
| 6,600,620 B1 | 7/2003 | Krounbi et al. |
| 6,601,137 B1 | 7/2003 | Castro et al. |
| 6,603,622 B1 | 8/2003 | Christiansen et al. |
| 6,603,625 B1 | 8/2003 | Hospodor et al. |
| 6,604,220 B1 | 8/2003 | Lee |
| 6,606,682 B1 | 8/2003 | Dang et al. |
| 6,606,714 B1 | 8/2003 | Thelin |
| 6,606,717 B1 | 8/2003 | Yu et al. |
| 6,611,393 B1 | 8/2003 | Nguyen et al. |
| 6,615,312 B1 | 9/2003 | Hamlin et al. |
| 6,639,748 B1 | 10/2003 | Christiansen et al. |
| 6,647,481 B1 | 11/2003 | Luu et al. |
| 6,654,193 B1 | 11/2003 | Thelin |
| 6,657,810 B1 | 12/2003 | Kupferman |
| 6,661,591 B1 | 12/2003 | Rothberg |
| 6,665,772 B1 | 12/2003 | Hamlin |
| 6,687,073 B1 | 2/2004 | Kupferman |
| 6,687,078 B1 | 2/2004 | Kim |
| 6,687,850 B1 | 2/2004 | Rothberg |
| 6,690,523 B1 | 2/2004 | Nguyen et al. |
| 6,690,882 B1 | 2/2004 | Hanmann et al. |
| 6,691,198 B1 | 2/2004 | Hamlin |
| 6,691,213 B1 | 2/2004 | Luu et al. |
| 6,691,255 B1 | 2/2004 | Rothberg et al. |
| 6,693,760 B1 | 2/2004 | Krounbi et al. |
| 6,694,477 B1 | 2/2004 | Lee |
| 6,697,914 B1 | 2/2004 | Hospodor et al. |
| 6,700,724 B2 | 3/2004 | Riddering et al. |
| 6,704,153 B1 | 3/2004 | Rothberg et al. |
| 6,708,251 B1 | 3/2004 | Boyle et al. |
| 6,710,951 B1 | 3/2004 | Cloke |
| 6,711,628 B1 | 3/2004 | Thelin |
| 6,711,635 B1 | 3/2004 | Wang |
| 6,711,660 B1 | 3/2004 | Milne et al. |
| 6,715,044 B2 | 3/2004 | Lofgren et al. |
| 6,724,982 B1 | 4/2004 | Hamlin |
| 6,725,329 B1 | 4/2004 | Ng et al. |
| 6,735,650 B1 | 5/2004 | Rothberg |
| 6,735,693 B1 | 5/2004 | Hamlin |
| 6,744,772 B1 | 6/2004 | Eneboe et al. |
| 6,745,283 B1 | 6/2004 | Dang |
| 6,751,402 B1 | 6/2004 | Elliott et al. |
| 6,757,481 B1 | 6/2004 | Nazarian et al. |
| 6,772,281 B2 | 8/2004 | Hamlin |
| 6,781,826 B1 | 8/2004 | Goldstone et al. |
| 6,782,449 B1 | 8/2004 | Codilian et al. |
| 6,791,779 B1 | 9/2004 | Singh et al. |
| 6,792,486 B1 | 9/2004 | Hanan et al. |
| 6,799,274 B1 | 9/2004 | Hamlin |
| 6,801,376 B2 | 10/2004 | Smith |
| 6,811,427 B2 | 11/2004 | Garrett et al. |
| 6,826,003 B1 | 11/2004 | Subrahmanyam |
| 6,826,614 B1 | 11/2004 | Hanmann et al. |
| 6,832,041 B1 | 12/2004 | Boyle |
| 6,832,929 B2 | 12/2004 | Garrett et al. |
| 6,845,405 B1 | 1/2005 | Thelin |
| 6,845,427 B1 | 1/2005 | Atai-Azimi |
| 6,850,443 B2 | 2/2005 | Lofgren et al. |
| 6,851,055 B1 | 2/2005 | Boyle et al. |
| 6,851,063 B1 | 2/2005 | Boyle et al. |
| 6,853,731 B1 | 2/2005 | Boyle et al. |
| 6,854,022 B1 | 2/2005 | Thelin |
| 6,862,660 B1 | 3/2005 | Wilkins et al. |
| 6,880,043 B1 | 4/2005 | Castro et al. |
| 6,882,486 B1 | 4/2005 | Kupferman |
| 6,883,368 B2 | 4/2005 | Smith et al. |
| 6,884,085 B1 | 4/2005 | Goldstone |
| 6,888,831 B1 | 5/2005 | Hospodor et al. |
| 6,892,217 B1 | 5/2005 | Hanmann et al. |
| 6,892,249 B1 | 5/2005 | Codilian et al. |
| 6,892,313 B1 | 5/2005 | Codilian et al. |
| 6,894,854 B1 | 5/2005 | Carlson et al. |
| 6,895,455 B1 | 5/2005 | Rothberg |
| 6,895,500 B1 | 5/2005 | Rothberg |
| 6,898,730 B1 | 5/2005 | Hanan |
| 6,910,099 B1 | 6/2005 | Wang et al. |
| 6,928,470 B1 | 8/2005 | Hamlin |
| 6,931,439 B1 | 8/2005 | Hanmann et al. |
| 6,934,104 B1 | 8/2005 | Kupferman |
| 6,934,713 B2 | 8/2005 | Schwartz et al. |
| 6,940,873 B2 | 9/2005 | Boyle et al. |
| 6,943,978 B1 | 9/2005 | Lee |
| 6,948,165 B1 | 9/2005 | Luu et al. |
| 6,950,260 B2 | 9/2005 | Coffey et al. |
| 6,950,267 B1 | 9/2005 | Liu et al. |
| 6,954,733 B1 | 10/2005 | Ellis et al. |
| 6,961,814 B1 | 11/2005 | Thelin et al. |
| 6,965,489 B1 | 11/2005 | Lee et al. |
| 6,965,563 B1 | 11/2005 | Hospodor et al. |
| 6,965,966 B1 | 11/2005 | Rothberg et al. |
| 6,967,799 B1 | 11/2005 | Lee |
| 6,968,422 B1 | 11/2005 | Codilian et al. |
| 6,968,450 B1 | 11/2005 | Rothberg et al. |
| 6,973,495 B1 | 12/2005 | Milne et al. |
| 6,973,570 B1 | 12/2005 | Hamlin |
| 6,975,472 B2 | 12/2005 | Stover et al. |
| 6,976,190 B1 | 12/2005 | Goldstone |
| 6,983,316 B1 | 1/2006 | Milne et al. |
| 6,986,007 B1 | 1/2006 | Procyk et al. |
| 6,986,154 B1 | 1/2006 | Price et al. |
| 6,995,933 B1 | 2/2006 | Codilian et al. |
| 6,996,501 B1 | 2/2006 | Rothberg |
| 6,996,669 B1 | 2/2006 | Dang et al. |
| 7,002,926 B1 | 2/2006 | Eneboe et al. |
| 7,003,674 B1 | 2/2006 | Hamlin |
| 7,006,316 B1 | 2/2006 | Sargenti, Jr. et al. |

(56) References Cited

U.S. PATENT DOCUMENTS

| | | |
|---|---|---|
| 7,009,820 B1 | 3/2006 | Hogg |
| 7,023,639 B1 | 4/2006 | Kupferman |
| 7,024,491 B1 | 4/2006 | Hanmann et al. |
| 7,024,549 B1 | 4/2006 | Luu et al. |
| 7,024,614 B1 | 4/2006 | Thelin et al. |
| 7,027,242 B1 | 4/2006 | Terrill et al. |
| 7,027,716 B1 | 4/2006 | Boyle et al. |
| 7,028,174 B1 | 4/2006 | Atai-Azimi et al. |
| 7,031,902 B1 | 4/2006 | Catiller |
| 7,046,465 B1 | 5/2006 | Kupferman |
| 7,046,488 B1 | 5/2006 | Hogg |
| 7,050,252 B1 | 5/2006 | Vallis |
| 7,054,937 B1 | 5/2006 | Milne et al. |
| 7,055,000 B1 | 5/2006 | Severtson |
| 7,055,167 B1 | 5/2006 | Masters |
| 7,057,836 B1 | 6/2006 | Kupferman |
| 7,062,398 B1 | 6/2006 | Rothberg |
| 7,068,449 B2 | 6/2006 | Riddering et al. |
| 7,075,746 B1 | 7/2006 | Kupferman |
| 7,076,604 B1 | 7/2006 | Thelin |
| 7,082,494 B1 | 7/2006 | Thelin et al. |
| 7,088,538 B1 | 8/2006 | Codilian et al. |
| 7,088,545 B1 | 8/2006 | Singh et al. |
| 7,092,186 B1 | 8/2006 | Hogg |
| 7,095,577 B1 | 8/2006 | Codilian et al. |
| 7,099,095 B1 | 8/2006 | Subrahmanyam et al. |
| 7,099,097 B2 | 8/2006 | Hamaguchi et al. |
| 7,106,537 B1 | 9/2006 | Bennett |
| 7,106,947 B2 | 9/2006 | Boyle et al. |
| 7,110,202 B1 | 9/2006 | Vasquez |
| 7,111,116 B1 | 9/2006 | Boyle et al. |
| 7,114,029 B1 | 9/2006 | Thelin |
| 7,120,737 B1 | 10/2006 | Thelin |
| 7,120,806 B1 | 10/2006 | Codilian et al. |
| 7,126,776 B1 | 10/2006 | Warren, Jr. et al. |
| 7,129,763 B1 | 10/2006 | Bennett et al. |
| 7,133,600 B1 | 11/2006 | Boyle |
| 7,136,244 B1 | 11/2006 | Rothberg |
| 7,146,094 B1 | 12/2006 | Boyle |
| 7,149,046 B1 | 12/2006 | Coker et al. |
| 7,150,036 B1 | 12/2006 | Milne et al. |
| 7,155,616 B1 | 12/2006 | Hamlin |
| 7,171,108 B1 | 1/2007 | Masters et al. |
| 7,171,110 B1 | 1/2007 | Wilshire |
| 7,180,692 B1 | 2/2007 | Che et al. |
| 7,194,576 B1 | 3/2007 | Boyle |
| 7,200,698 B1 | 4/2007 | Rothberg |
| 7,205,805 B1 | 4/2007 | Bennett |
| 7,206,497 B1 | 4/2007 | Boyle et al. |
| 7,215,496 B1 | 5/2007 | Kupferman et al. |
| 7,215,771 B1 | 5/2007 | Hamlin |
| 7,237,054 B1 | 6/2007 | Cain et al. |
| 7,240,161 B1 | 7/2007 | Boyle |
| 7,249,365 B1 | 7/2007 | Price et al. |
| 7,263,709 B1 | 8/2007 | Krapf |
| 7,274,639 B1 | 9/2007 | Codilian et al. |
| 7,274,659 B2 | 9/2007 | Hospodor |
| 7,275,116 B1 | 9/2007 | Hanmann et al. |
| 7,280,302 B1 | 10/2007 | Masiewicz |
| 7,292,774 B1 | 11/2007 | Masters et al. |
| 7,292,775 B1 | 11/2007 | Boyle et al. |
| 7,296,284 B1 | 11/2007 | Price et al. |
| 7,302,501 B1 | 11/2007 | Cain et al. |
| 7,302,579 B1 | 11/2007 | Cain et al. |
| 7,318,088 B1 | 1/2008 | Mann |
| 7,319,806 B1 | 1/2008 | Willner et al. |
| 7,325,244 B2 | 1/2008 | Boyle et al. |
| 7,330,323 B1 | 2/2008 | Singh et al. |
| 7,342,736 B1 * | 3/2008 | Turner et al. .................... 360/75 |
| 7,346,790 B1 | 3/2008 | Klein |
| 7,366,641 B1 | 4/2008 | Masiewicz et al. |
| 7,369,340 B1 | 5/2008 | Dang et al. |
| 7,369,343 B1 | 5/2008 | Yeo et al. |
| 7,372,650 B1 | 5/2008 | Kupferman |
| 7,380,147 B1 | 5/2008 | Sun |
| 7,392,340 B1 | 6/2008 | Dang et al. |
| 7,404,013 B1 | 7/2008 | Masiewicz |
| 7,406,545 B1 | 7/2008 | Rothberg et al. |
| 7,415,571 B1 | 8/2008 | Hanan |
| 7,436,610 B1 | 10/2008 | Thelin |
| 7,437,502 B1 | 10/2008 | Coker |
| 7,440,214 B1 | 10/2008 | Ell et al. |
| 7,440,219 B2 | 10/2008 | Zhu et al. |
| 7,451,344 B1 | 11/2008 | Rothberg |
| 7,471,483 B1 | 12/2008 | Ferris et al. |
| 7,471,486 B1 | 12/2008 | Coker et al. |
| 7,486,060 B1 | 2/2009 | Bennett |
| 7,489,466 B2 | 2/2009 | Knigge et al. |
| 7,496,493 B1 | 2/2009 | Stevens |
| 7,508,617 B1 | 3/2009 | Mak et al. |
| 7,518,819 B1 | 4/2009 | Yu et al. |
| 7,526,184 B1 | 4/2009 | Parkinen et al. |
| 7,539,924 B1 | 5/2009 | Vasquez et al. |
| 7,542,246 B1 | 6/2009 | Song et al. |
| 7,543,117 B1 | 6/2009 | Hanan |
| 7,551,383 B1 | 6/2009 | Kupferman |
| 7,562,282 B1 | 7/2009 | Rothberg |
| 7,573,682 B2 | 8/2009 | Pust et al. |
| 7,577,973 B1 | 8/2009 | Kapner, III et al. |
| 7,596,797 B1 | 9/2009 | Kapner, III et al. |
| 7,599,139 B1 | 10/2009 | Bombet et al. |
| 7,619,841 B1 | 11/2009 | Kupferman |
| 7,647,544 B1 | 1/2010 | Masiewicz |
| 7,649,704 B1 | 1/2010 | Bombet et al. |
| 7,653,927 B1 | 1/2010 | Kapner, III et al. |
| 7,656,603 B1 | 2/2010 | Xing |
| 7,656,763 B1 | 2/2010 | Jin et al. |
| 7,657,149 B2 | 2/2010 | Boyle |
| 7,672,072 B1 | 3/2010 | Boyle et al. |
| 7,673,075 B1 | 3/2010 | Masiewicz |
| 7,675,707 B1 | 3/2010 | Liu et al. |
| 7,688,540 B1 | 3/2010 | Mei et al. |
| 7,715,135 B1 * | 5/2010 | Sutardja et al. .................... 360/40 |
| 7,724,461 B1 | 5/2010 | McFadyen et al. |
| 7,725,584 B1 | 5/2010 | Hanmann et al. |
| 7,730,295 B1 | 6/2010 | Lee |
| 7,760,458 B1 | 7/2010 | Trinh |
| 7,768,776 B1 | 8/2010 | Szeremeta et al. |
| 7,804,657 B1 | 9/2010 | Hogg et al. |
| 7,813,954 B1 | 10/2010 | Price et al. |
| 7,827,320 B1 | 11/2010 | Stevens |
| 7,839,588 B1 | 11/2010 | Dang et al. |
| 7,839,595 B1 | 11/2010 | Chue et al. |
| 7,843,660 B1 | 11/2010 | Yeo |
| 7,852,596 B2 | 12/2010 | Boyle et al. |
| 7,859,782 B1 | 12/2010 | Lee |
| 7,872,822 B1 | 1/2011 | Rothberg |
| 7,898,756 B1 | 3/2011 | Wang |
| 7,898,762 B1 | 3/2011 | Guo et al. |
| 7,900,037 B1 | 3/2011 | Fallone et al. |
| 7,907,364 B2 | 3/2011 | Boyle et al. |
| 7,916,420 B1 | 3/2011 | McFadyen et al. |
| 7,929,234 B1 | 4/2011 | Boyle et al. |
| 7,933,087 B1 | 4/2011 | Tsai et al. |
| 7,933,090 B1 | 4/2011 | Jung et al. |
| 7,934,030 B1 | 4/2011 | Sargenti, Jr. et al. |
| 7,940,491 B2 | 5/2011 | Szeremeta et al. |
| 7,944,639 B1 | 5/2011 | Wang |
| 7,945,727 B2 | 5/2011 | Rothberg et al. |
| 7,949,564 B1 | 5/2011 | Hughes et al. |
| 7,974,029 B2 | 7/2011 | Tsai et al. |
| 7,974,039 B1 | 7/2011 | Xu et al. |
| 7,982,993 B1 | 7/2011 | Tsai et al. |
| 7,984,200 B1 | 7/2011 | Bombet et al. |
| 7,990,647 B2 | 8/2011 | Lille |
| 7,990,648 B1 | 8/2011 | Wang |
| 7,992,179 B1 | 8/2011 | Kapner, III et al. |
| 8,004,785 B1 | 8/2011 | Tsai et al. |
| 8,006,027 B1 | 8/2011 | Stevens et al. |
| 8,014,094 B1 | 9/2011 | Jin |
| 8,014,977 B1 | 9/2011 | Masiewicz et al. |
| 8,019,914 B1 | 9/2011 | Vasquez et al. |
| 8,040,625 B1 | 10/2011 | Boyle et al. |
| 8,059,357 B1 | 11/2011 | Knigge et al. |

(56) References Cited

U.S. PATENT DOCUMENTS

| | | |
|---|---|---|
| 8,078,943 B1 | 12/2011 | Lee |
| 8,079,045 B2 | 12/2011 | Krapf et al. |
| 8,082,433 B1 | 12/2011 | Fallone et al. |
| 8,085,487 B1 | 12/2011 | Jung et al. |
| 8,089,719 B1 | 1/2012 | Dakroub |
| 8,090,902 B1 | 1/2012 | Bennett et al. |
| 8,090,906 B1 | 1/2012 | Blaha et al. |
| 8,091,112 B1 | 1/2012 | Elliott et al. |
| 8,094,396 B1 | 1/2012 | Zhang et al. |
| 8,094,401 B1 | 1/2012 | Peng et al. |
| 8,116,020 B1 | 2/2012 | Lee |
| 8,116,025 B1 | 2/2012 | Chan et al. |
| 8,134,793 B1 | 3/2012 | Vasquez et al. |
| 8,134,798 B1 | 3/2012 | Thelin et al. |
| 8,139,301 B1 | 3/2012 | Li et al. |
| 8,139,310 B1 | 3/2012 | Hogg |
| 8,144,419 B1 | 3/2012 | Liu |
| 8,145,452 B1 | 3/2012 | Masiewicz et al. |
| 8,149,528 B1 | 4/2012 | Suratman et al. |
| 8,154,812 B1 | 4/2012 | Boyle et al. |
| 8,159,768 B1 | 4/2012 | Miyamura |
| 8,161,328 B1 | 4/2012 | Wilshire |
| 8,164,849 B1 | 4/2012 | Szeremeta et al. |
| 8,174,780 B1 | 5/2012 | Tsai et al. |
| 8,190,575 B1 | 5/2012 | Ong et al. |
| 8,194,338 B1 | 6/2012 | Zhang |
| 8,194,340 B1 | 6/2012 | Boyle et al. |
| 8,194,341 B1 | 6/2012 | Boyle |
| 8,201,066 B1 | 6/2012 | Wang |
| 8,271,692 B1 | 9/2012 | Dinh et al. |
| 8,279,550 B1 | 10/2012 | Hogg |
| 8,281,218 B1 | 10/2012 | Ybarra et al. |
| 8,285,923 B2 | 10/2012 | Stevens |
| 8,289,656 B1 | 10/2012 | Huber |
| 8,300,338 B1 | 10/2012 | McFadyen |
| 8,305,705 B1 | 11/2012 | Roohr |
| 8,307,156 B1 | 11/2012 | Codilian et al. |
| 8,310,775 B1 | 11/2012 | Boguslawski et al. |
| 8,315,006 B1 | 11/2012 | Chahwan et al. |
| 8,316,263 B1 | 11/2012 | Gough et al. |
| 8,320,067 B1 | 11/2012 | Tsai et al. |
| 8,320,069 B1 | 11/2012 | Knigge et al. |
| 8,324,974 B1 | 12/2012 | Bennett |
| 8,332,695 B2 | 12/2012 | Dalphy et al. |
| 8,339,919 B1 | 12/2012 | Lee |
| 8,341,337 B1 | 12/2012 | Ong et al. |
| 8,350,628 B1 | 1/2013 | Bennett |
| 8,356,184 B1 | 1/2013 | Meyer et al. |
| 8,370,683 B1 | 2/2013 | Ryan et al. |
| 8,375,225 B1 | 2/2013 | Ybarra |
| 8,375,274 B1 | 2/2013 | Bonke |
| 8,380,922 B1 | 2/2013 | DeForest et al. |
| 8,390,948 B2 | 3/2013 | Hogg |
| 8,390,952 B1 | 3/2013 | Szeremeta |
| 8,392,689 B1 | 3/2013 | Lott |
| 8,407,393 B1 | 3/2013 | Yolar et al. |
| 8,413,010 B1 | 4/2013 | Vasquez et al. |
| 8,417,566 B2 | 4/2013 | Price et al. |
| 8,421,663 B1 | 4/2013 | Bennett |
| 8,422,172 B1 | 4/2013 | Dakroub et al. |
| 8,427,770 B1 | 4/2013 | O'Dell et al. |
| 8,427,771 B1 | 4/2013 | Tsai |
| 8,429,343 B1 | 4/2013 | Tsai |
| 8,433,937 B1 | 4/2013 | Wheelock et al. |
| 8,433,977 B1 | 4/2013 | Vasquez et al. |
| 8,441,909 B1 | 5/2013 | Thayamballi et al. |
| 8,456,643 B2 | 6/2013 | Prabhakaran et al. |
| 8,456,980 B1 | 6/2013 | Thayamballi |
| 8,458,526 B2 | 6/2013 | Dalphy et al. |
| 8,462,466 B2 | 6/2013 | Huber |
| 8,467,151 B1 | 6/2013 | Huber |
| 8,483,027 B1 | 7/2013 | Mak et al. |
| 8,489,841 B1 | 7/2013 | Strecke et al. |
| 8,493,679 B1 | 7/2013 | Boguslawski et al. |
| 8,499,198 B1 | 7/2013 | Messenger et al. |
| 8,503,125 B2 * | 8/2013 | Contreras et al. ............... 360/59 |
| 8,514,506 B1 | 8/2013 | Li et al. |
| 8,514,673 B1 | 8/2013 | Zhao et al. |
| 8,526,274 B2 | 9/2013 | Naniwa et al. |
| 8,554,741 B1 | 10/2013 | Malina |
| 8,560,759 B1 | 10/2013 | Boyle et al. |
| 8,565,049 B1 | 10/2013 | Tanner et al. |
| 8,576,509 B1 | 11/2013 | Hogg |
| 8,576,511 B1 | 11/2013 | Coker et al. |
| 8,578,100 B1 | 11/2013 | Huynh et al. |
| 8,578,242 B1 | 11/2013 | Burton et al. |
| 8,582,223 B1 | 11/2013 | Garani et al. |
| 8,582,231 B1 | 11/2013 | Kermiche et al. |
| 8,589,773 B1 | 11/2013 | Wang et al. |
| 8,593,753 B1 | 11/2013 | Anderson |
| 8,599,512 B2 | 12/2013 | Hogg |
| 8,605,379 B1 | 12/2013 | Sun |
| 8,611,031 B1 | 12/2013 | Tan et al. |
| 8,611,032 B2 | 12/2013 | Champion et al. |
| 8,612,798 B1 | 12/2013 | Tsai |
| 8,619,383 B1 | 12/2013 | Jung et al. |
| 8,619,508 B1 | 12/2013 | Krichevsky et al. |
| 8,619,529 B1 | 12/2013 | Liew et al. |
| 8,621,115 B1 | 12/2013 | Bombet et al. |
| 8,621,133 B1 | 12/2013 | Boyle |
| 8,625,224 B1 | 1/2014 | Lin et al. |
| 8,625,225 B1 | 1/2014 | Wang |
| 8,626,463 B2 | 1/2014 | Stevens et al. |
| 8,630,052 B1 | 1/2014 | Jung et al. |
| 8,631,188 B1 | 1/2014 | Heath et al. |
| 8,635,412 B1 | 1/2014 | Wilshire |
| 8,661,193 B1 | 2/2014 | Cobos et al. |
| 8,665,547 B1 | 3/2014 | Yeo et al. |
| 8,667,248 B1 | 3/2014 | Neppalli |
| 8,670,205 B1 | 3/2014 | Malina et al. |
| 8,671,250 B2 | 3/2014 | Lee |
| 8,681,442 B2 | 3/2014 | Hogg |
| 8,681,445 B1 | 3/2014 | Kermiche et al. |
| 8,683,295 B1 | 3/2014 | Syu et al. |
| 8,687,306 B1 | 4/2014 | Coker et al. |
| 8,687,307 B1 | 4/2014 | Patton, III |
| 8,687,313 B2 | 4/2014 | Selvaraj |
| 8,693,133 B1 | 4/2014 | Lee et al. |
| 8,698,492 B1 | 4/2014 | Mak et al. |
| 8,699,171 B1 | 4/2014 | Boyle |
| 8,699,172 B1 | 4/2014 | Gunderson et al. |
| 8,711,500 B1 | 4/2014 | Fong et al. |
| 8,711,506 B1 | 4/2014 | Giovenzana et al. |
| 8,711,665 B1 | 4/2014 | Abdul Hamid |
| 8,717,694 B1 | 5/2014 | Liew et al. |
| 8,717,695 B1 | 5/2014 | Lin et al. |
| 8,730,612 B1 | 5/2014 | Haralson |
| 8,743,502 B1 | 6/2014 | Bonke et al. |
| 8,749,911 B1 | 6/2014 | Sun et al. |
| 8,753,146 B1 | 6/2014 | Szeremeta et al. |
| 8,755,136 B1 | 6/2014 | Ng et al. |
| 8,756,361 B1 | 6/2014 | Carlson et al. |
| 8,760,782 B1 | 6/2014 | Garani et al. |
| 8,760,792 B1 | 6/2014 | Tam |
| 8,769,593 B1 | 7/2014 | Schwartz et al. |
| 8,773,793 B1 | 7/2014 | McFadyen |
| 8,773,802 B1 | 7/2014 | Anderson et al. |
| 8,773,807 B1 | 7/2014 | Chia et al. |
| 8,773,957 B1 | 7/2014 | Champion et al. |
| 8,780,470 B1 | 7/2014 | Wang et al. |
| 8,782,334 B1 | 7/2014 | Boyle et al. |
| 8,786,976 B1 | 7/2014 | Kang et al. |
| 8,787,125 B1 | 7/2014 | Lee |
| 8,792,196 B1 | 7/2014 | Lee |
| 8,792,200 B1 | 7/2014 | Tam et al. |
| 8,797,667 B1 | 8/2014 | Barlow et al. |
| 8,799,977 B1 | 8/2014 | Kapner, III et al. |
| 8,817,413 B1 | 8/2014 | Knigge et al. |
| 8,817,584 B1 | 8/2014 | Selvaraj |
| 8,825,976 B1 | 9/2014 | Jones |
| 8,825,977 B1 | 9/2014 | Syu et al. |
| 8,897,104 B1 | 11/2014 | Yan et al. |
| 2004/0141186 A1 | 7/2004 | Hu et al. |
| 2005/0165561 A1 | 7/2005 | Zeng |

(56) References Cited

U.S. PATENT DOCUMENTS

| | | |
|---|---|---|
| 2006/0103959 A1 | 5/2006 | Lu |
| 2007/0230012 A1 | 10/2007 | Erden et al. |
| 2008/0080086 A1 | 4/2008 | Che et al. |
| 2008/0198510 A1 | 8/2008 | Sugimoto et al. |
| 2008/0225427 A1 | 9/2008 | Liu |
| 2008/0247073 A1 | 10/2008 | Park |
| 2009/0113464 A1 | 4/2009 | Gage et al. |
| 2009/0113702 A1 | 5/2009 | Hogg |
| 2009/0207519 A1 | 8/2009 | Erden et al. |
| 2009/0268335 A1 | 10/2009 | Huang et al. |
| 2010/0123967 A1 | 5/2010 | Batra et al. |
| 2010/0306551 A1 | 12/2010 | Meyer et al. |
| 2011/0226729 A1 | 9/2011 | Hogg |
| 2011/0286129 A1 | 11/2011 | Prabhakaran et al. |
| 2012/0159042 A1 | 6/2012 | Lott et al. |
| 2012/0275050 A1 | 11/2012 | Wilson et al. |
| 2012/0281963 A1 | 11/2012 | Krapf et al. |
| 2012/0324980 A1 | 12/2012 | Nguyen et al. |
| 2013/0094104 A1 | 4/2013 | Ngan et al. |
| 2013/0286802 A1 | 10/2013 | Kiely |
| 2013/0286805 A1 | 10/2013 | Macken et al. |
| 2013/0286807 A1 | 10/2013 | Gao et al. |
| 2014/0029396 A1 | 1/2014 | Rausch et al. |
| 2014/0036646 A1 | 2/2014 | Peng et al. |
| 2015/0003223 A1* | 1/2015 | Macken et al. ............ 369/13.33 |

OTHER PUBLICATIONS

Kurita, M., et al., "Optical Measurement of Flying-Height Change Due to Thermal Protrusion of Magnetic Head," Asia-Pacific Magnetic Recording Conference—2006, Publication Date: Nov. 29, 2006-Dec. 1, 2006, 1 page.

Nikitin, V., et al., "Spatial and Temporal Profiling of Protrusion in Magnetic Recording Heads," IEEE Transactions on Magnetics, vol. 40 (1), Jan. 2004, pp. 326-331.

Xu, J., et al., "High-Resolution Measurement of Temperature Distribution in Head Coil and Air Bearing Surface," IEEE Transactions on Magnetics, vol. 39 (5), Sep. 2003, pp. 2411-2413.

Xu, J., et al., "Thermal Analysis of a Magnetic Head," IEEE Transactions on Magnetics, vol. 40 (4), Jul. 2004, pp. 3142-3144.

Huanxiang Ruan, et al., U.S. Appl. No. 14/253,491, filed Apr. 15, 2014, 21 pages.

\* cited by examiner

DATA STORAGE DEVICE MEASURING LASER PROTRUSION FLY HEIGHT PROFILE

BACKGROUND

Data storage devices such as disk drives may comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo controller to control the actuator arm as it seeks from track to track.

Data is typically written to the disk by modulating a write current in an inductive coil to record magnetic transitions onto the disk surface in a process referred to as saturation recording. During readback, the magnetic transitions are sensed by a read element (e.g., a magnetoresistive element) and the resulting read signal demodulated by a suitable read channel. Heat assisted magnetic recording (HAMR) is a recent development that improves the quality of written data by heating the disk surface with a laser during write operations in order to decrease the coercivity of the magnetic medium, thereby enabling the magnetic field generated by the write coil to more readily magnetize the disk surface.

Figure 1:
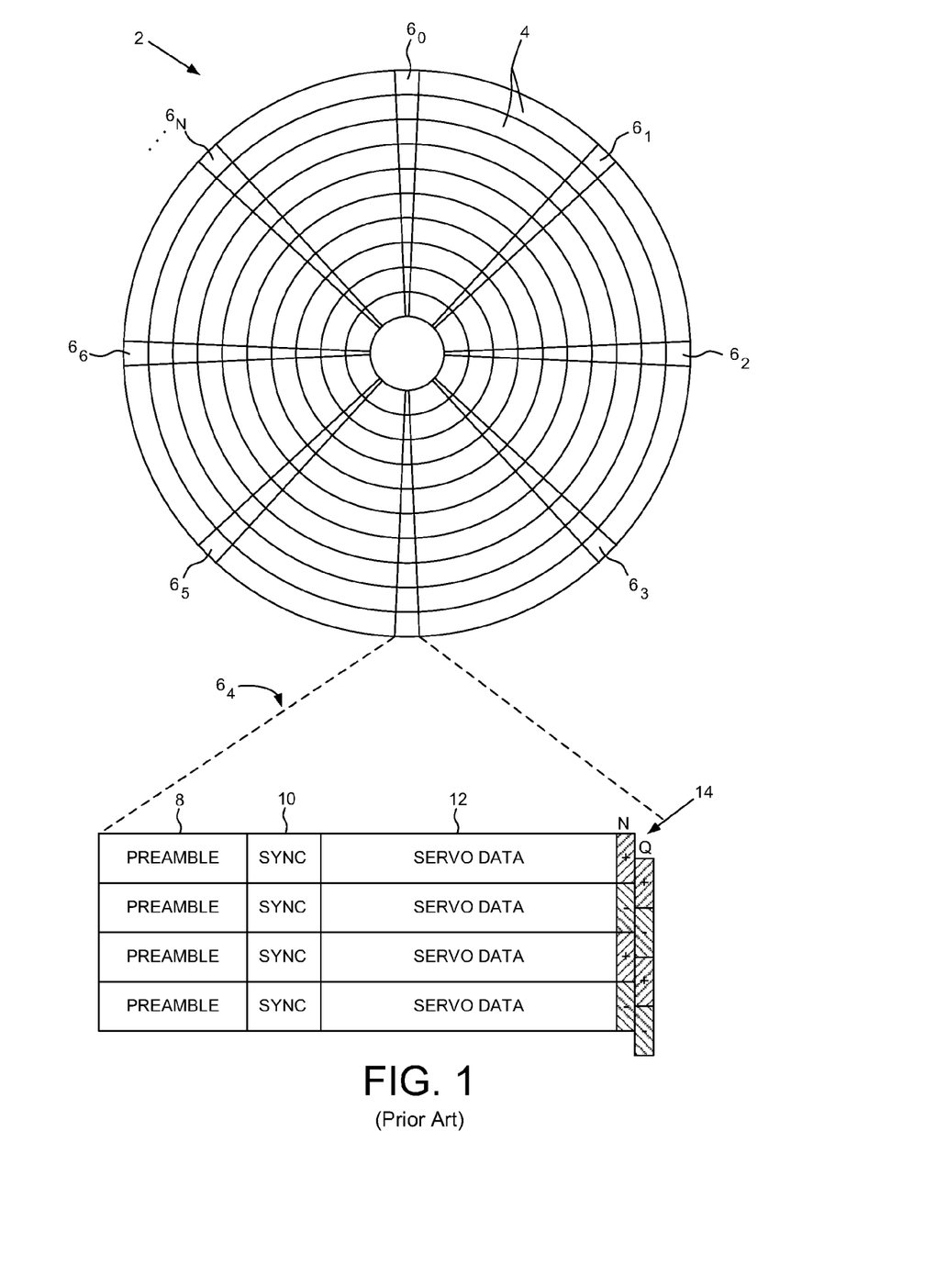
FIG. 1 shows a prior art disk format comprising a plurality of servo sectors defining servo tracks.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

DETAILED DESCRIPTION

Figure 2A:
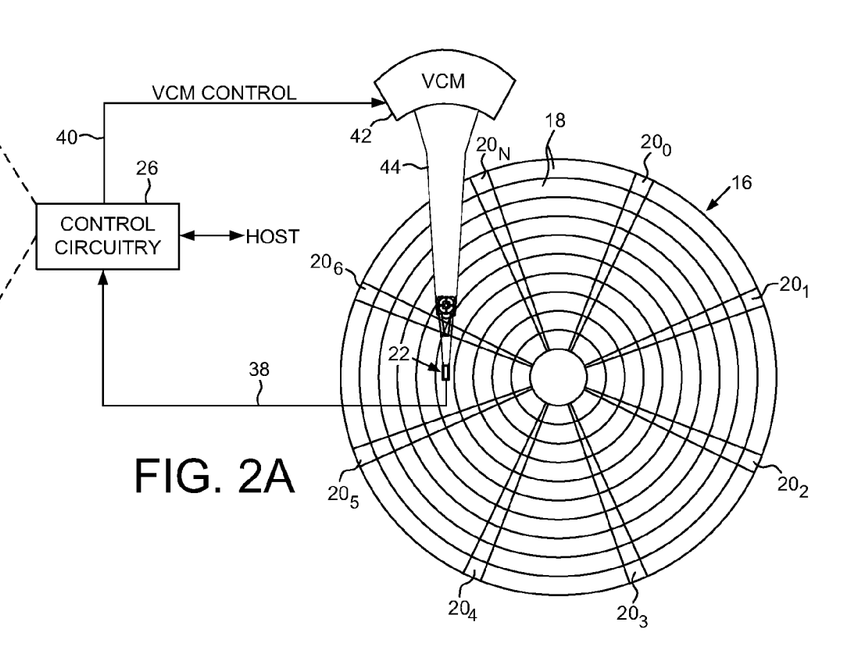
FIG. 2A shows a data storage device in the form of a disk drive according to an embodiment comprising a head actuated over a disk.

FIG. 2A shows a data storage device in the form of a disk drive according to an embodiment comprising a disk 16 comprising a plurality of tracks 18, where each track comprises a plurality of servo sectors $20_0$-$20_N$ and at least one data segment between consecutive servo sectors. The disk drive further comprises a head 22 (FIG. 2B) actuated over the disk 16, the head 22 comprising a laser 24 configured to heat the disk 16 during write operations based on a laser power. Control circuitry 26 is configured to execute the flow diagram of FIG. 2C, wherein during a first revolution of the disk when the head reaches a first data segment (block 28), the laser power is first increased (block 30) over a first interval (block 32) to cause at least part of the head to protrude toward the first data segment. After the first interval, the laser power is decreased (block 34) and a fly height pattern is read from the first data segment to first measure a fly height of the head (block 36).

In the embodiment of FIG. 2A, the servo sectors $20_0$-$20_N$ define a plurality of servo tracks 18, wherein data tracks are defined relative to the servo tracks at the same or different radial density. The control circuitry 26 processes a read signal 38 emanating from the head 22 to demodulate the servo sectors $20_0$-$20_N$ and generate a position error signal (PES) representing an error between the actual position of the head and a target position relative to a target track. The control circuitry 26 filters the PES using a suitable compensation filter to generate a control signal 40 applied to a voice coil motor (VCM) 42 which rotates an actuator arm 44 about a pivot in order to actuate the head 22 radially over the disk 16 in a direction that reduces the PES. The servo sectors $20_0$-$20_N$ may comprise any suitable head position information, such as a track address for coarse positioning and servo bursts for fine positioning. The servo bursts may comprise any suitable pattern, such as an amplitude based servo pattern or a phase based servo pattern.

Figure 2B:
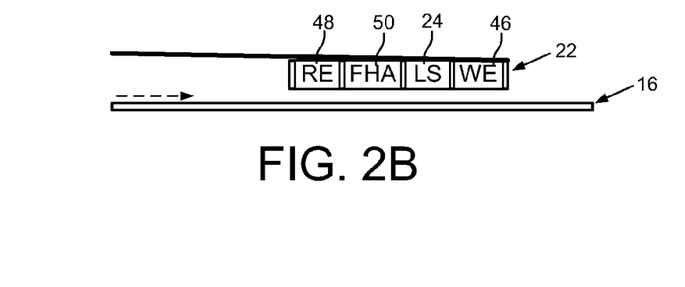
FIG. 2B shows a head according to an embodiment comprising a laser configured to heat the disk during write operations based on a laser power.
Figure 2C:
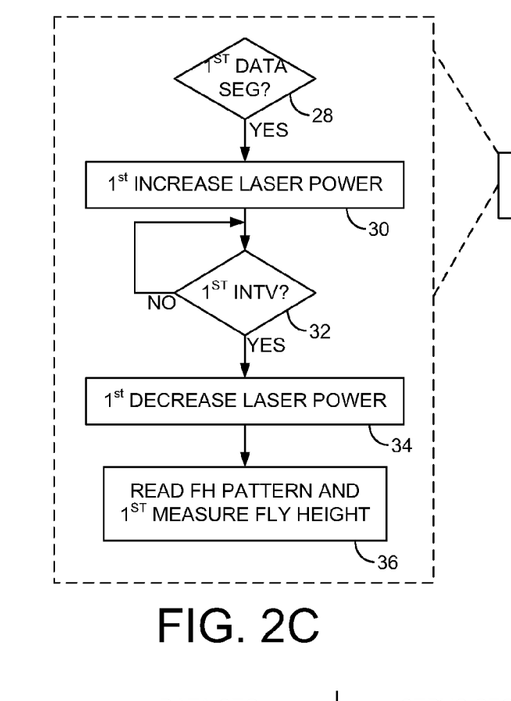
FIG. 2C is a flow diagram according to an embodiment wherein after increasing the laser power for a first interval, the laser power is decreased and a fly height pattern is read from a first data segment to measure a fly height of the head.

In the embodiment of FIG. 2B, the head 22 comprises a suitable write element 46 (e.g., an inductive write coil), a suitable read element 48 (e.g., a magnetoresistive element), and a suitable fly height actuator (FHA) 50 (e.g., a thermal element). Any suitable laser 24 may also be employed in the head 22, such as a suitable laser diode, together with any other suitable optical components for implementing HAMR, such as a suitable waveguide and a suitable near field transducer for focusing the laser beam onto the surface of the disk 16. In one embodiment, when the laser power is increased, there is a heating effect that causes at least part of the head 22 to protrude toward the disk 16. That is, the heating effect due to increasing the laser power results in a protrusion fly height profile of the head 22 an example of which is shown in FIG. 3B. In one embodiment, the protrusion fly height profile due to the heating effect of the laser is measured and a corresponding control setting profile for the FHA 50 is generated in order to compensate for the change in fly height, thereby achieving a substantially constant fly height throughout a write operation.

Figure 3A:
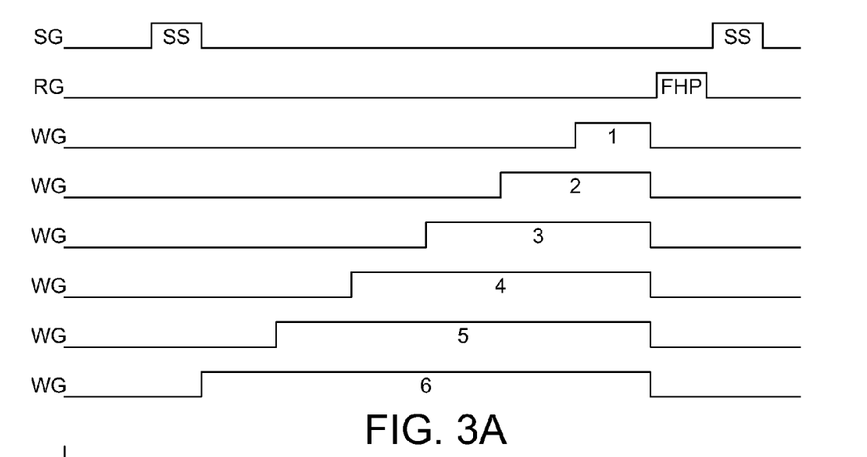
FIGS. 3A and 3B show an embodiment wherein multiple fly height measurements are taken to characterize a protrusion fly height profile for the head at the beginning of write operations.
Figure 3B:
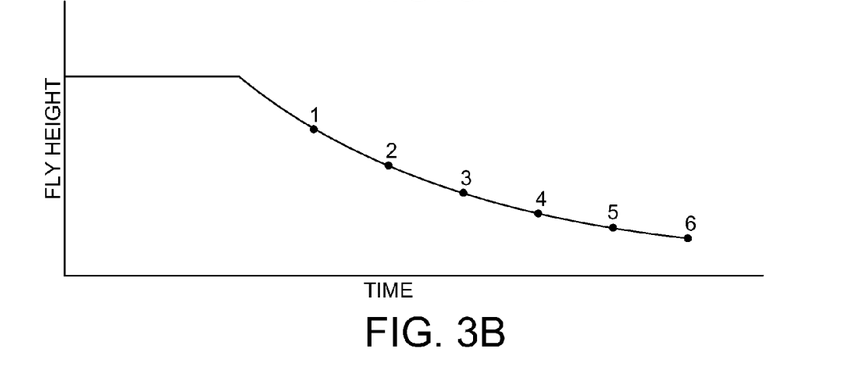

In one embodiment shown in FIG. 3A, when the head 22 is over a target data segment during a first revolution of the disk, the control circuitry 26 configures the disk drive into a write mode including to increase the laser power to a write power as well as apply a write current to the write element 46 in order to write data to the first data segment. The combined heating effect of the laser 24 and the write element 46 causes at least part of the head 22 to protrude toward the first data segment for a first interval of the protrusion fly height profile shown in FIG. 3B. After the first interval, the control circuitry 26 configures the disk drive into a read mode (decreases the laser power and disables the write current) in order to read a suitable fly height pattern (FHP) from the first data segment. The control circuitry 26 processes the resulting read signal 38 to measure the fly height of the head 22 at a corresponding first point of the protrusion fly height profile as shown in FIG. 3B. In one embodiment, reading the fly height pattern almost immediately after terminating the write mode results in a fairly accurate fly height measurement before the protrusion recedes (due to thermal cooling). After measuring the fly height, the control circuitry 26 allows the head 22 to cool so that the thermal protrusion recedes to the initial fly height shown in FIG. 3B. During a second revolution of the disk, the control circuitry 26 again configures the disk drive into the write mode (increases the laser power and applies the write current) for a second interval longer than the first interval as shown in FIG. 3A. After the second interval, the control circuitry 26 configures the disk drive into the read mode (decreases the laser power and disables the write current) in order to read the FHP and generate a second fly height measurement for the protrusion fly height profile as shown in FIG. 3B. This process is repeated for incrementally longer intervals as shown in FIG. 3A until a sufficient number of fly height measurements have been taken in order to characterize the protrusion fly height profile as shown in FIG. 3B.

Figure 4A:
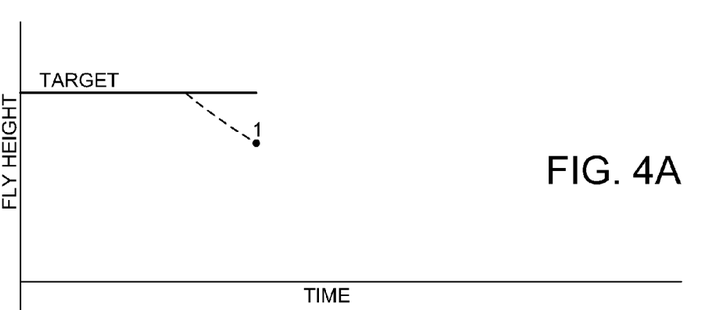
FIGS. 4A-4C illustrate an embodiment wherein a control setting applied to a fly height actuator (FHA) is adjusted in response to the measured fly heights in order to maintain a target fly height.
Figure 4B:
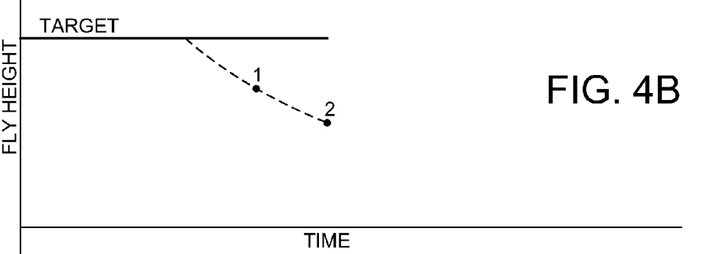
Figure 4C:
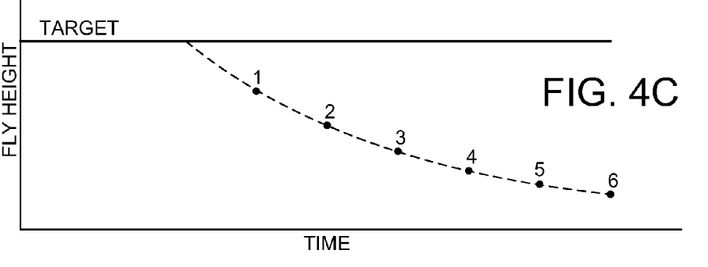

In one embodiment, the control setting applied to the FHA 50 is adjusted based on a control setting profile that compensates for the thermal protrusion of the head at the beginning of a write operation. For example, the control setting profile applied to the FHA 50 may attempt to maintain the head 22 at the same fly height prior to configuring the disk drive into the write mode. FIG. 4A illustrates an embodiment wherein the fly height measurement taken after the first interval of the write operation is used to generate a first FHA setting (FIG. 5) that attempts to compensate for the change in fly height. During a second revolution of the disk, the first FHA setting is applied to the FHA 50 during the first interval and a second fly height measurement is taken. If the second fly height measurement differs from the target fly height beyond a threshold, the first FHA setting is again adjusted and the process repeated until the first FHA setting causes the measured fly height to substantially match the target fly height. The control circuitry 26 then configures the disk drive into the write mode for the second interval as shown in FIG. 4B in order to make a corresponding fly height measurement. During the first interval of FIG. 4B, the control circuitry 26 applies the first FHA setting previously calibrated to the FHA 50 so that the fly height of the head 22 remains near the target fly height during the first interval. Accordingly, the fly height measurement taken after the second interval corresponds to the fly height deviation after the first interval until the end of the second interval. The fly height measurement after the second interval is used to adjust the second FHA setting of the profile shown in FIG. 5. During a subsequent revolution of the disk, the control circuitry 26 applies the first FHA setting during the first interval, and the second FHA setting during the remaining of the second interval in order to re-measure the fly height. This process is repeated until the first and second FHA settings result in a fly height that substantially matches the target fly height at the end of the second interval. This process is then repeated for the remaining intervals as shown in FIG. 4C in order to generate the complete control setting profile for the FHA 50 shown in FIG. 5.

Figure 5:
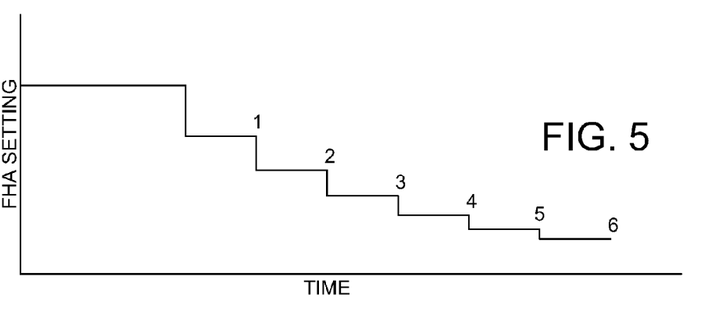
FIG. 5 shows a control setting profile for the FHA that achieves a target fly height at the beginning of write operations according to an embodiment.

In another embodiment, the control setting profile for the FHA such as shown in FIG. 5 may be generated directly from the measured protrusion fly height profile such as shown in FIG. 3B. In yet another embodiment, the control setting profile for the FHA 50 may be initialized based on the measured protrusion fly height profile such as shown in FIG. 3B, and then each control setting tuned until the measured fly height after each interval substantially matches the target fly height as described above. In another embodiment, the control circuitry 26 may generate the control setting profile for the FHA 50 with a suitable phase lead for one or more of the control settings in order to optimize the control setting profile.

In the embodiment of FIG. 3A, the fly height pattern (FHP) is recorded in a data segment that spans the area between consecutive servo sectors (SS). In this embodiment, the protrusion fly height profile may be measured without interrupting the write mode by reading a servo sector (and without cooling the head while reading the servo sector). In another embodiment, the protrusion fly height profile may be measured across a servo sector including to take into account the cooling effect when reading the servo sector. A control setting profile may also be generated for the FHA 50 corresponding to when a servo sector is encountered during a write operation. That is, during normal operation the control circuitry 26 may select the control setting profile for the FHA 50 based on when a write operation begins relative to the first encountered servo sector.

Figure 6A:
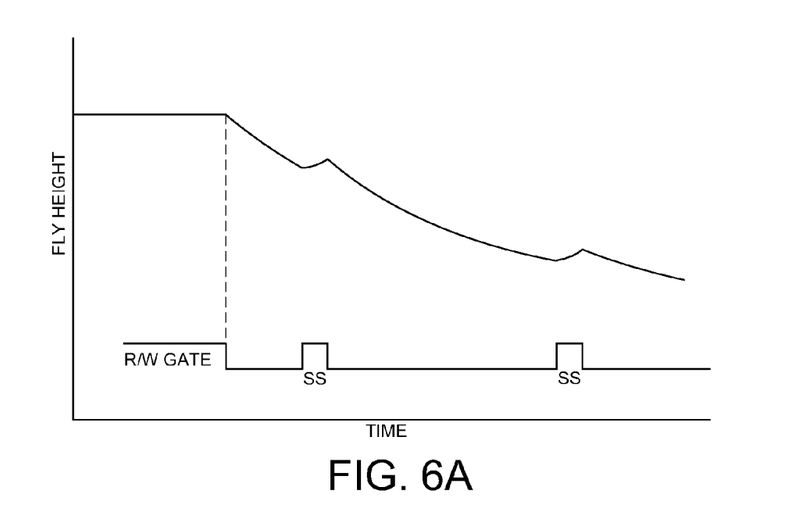
FIGS. 6A and 6B illustrate an embodiment wherein the protrusion fly height profile is measured over multiple data segments spanning multiple servo sectors.

FIG. 6A shows an embodiment wherein the protrusion fly height profile may span two or more servo sectors (SS). That is, the protrusion of at least part of the head 22 at the beginning of a write operation due to thermal expansion may last through a number of servo sectors before settling to a steady state. Accordingly, in one embodiment the above described process for measuring the protrusion fly height profile may include intervals that span multiple servo sectors, including the cooling effect of reading each servo sector. Also in this embodiment the protrusion fly height profile may be measured at different starting locations relative to the first encountered servo sector so that the cooling effect of the servo sectors on the protrusion fly height profile as shown in FIG. 6A may be taken into account.

Figure 6B:
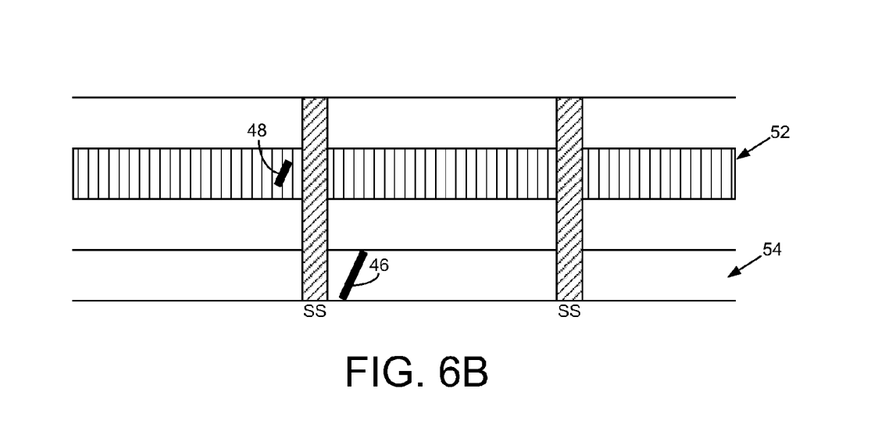

FIG. 6B illustrates an embodiment that may facilitate measuring the protrusion fly height profile at any given offset relative to the first encountered servo sector. In this embodiment, a suitable fly height pattern is written in the data segments of a first data track 52. The control circuitry 26 then positions the read element 48 over the first data track 52 and the write element 46 over a second data track 54. During subsequent revolutions of the disk, the control circuitry 26 configures the disk drive into the write mode over varying intervals and then reads the fly height pattern to generate the protrusion fly height profile as described above. Since the fly height pattern is written over multiple data segments of the first data track 52, the fly height measurement may be taken at essentially any desired offset relative to the first encountered servo sector, and therefore in one embodiment the protrusion fly height profile may be measured at a number of different circumferential offsets relative to the servo sectors. Since in one embodiment the write element 46 is offset radially from the read element 48, the write element 46 does not erase the fly height pattern in the first data track 52 while writing data to the second data track 54.

Figure 2D:
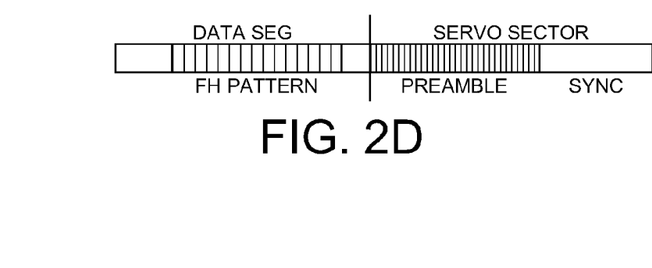
FIG. 2D shows an embodiment wherein each servo sector comprises a servo preamble recorded at a first frequency, and the fly height pattern comprises a second frequency different from the first frequency.

Any suitable fly height pattern may be written to the disk in the embodiments described above, and any suitable technique may be used to measure the fly height by reading the fly height pattern. In one embodiment, the fly height pattern comprises a sequence of periodic transitions that results in one or more sinusoids in the read signal 38. The read signal 38 may be processed, for example, by evaluating a ratio of harmonics in the read signal according to a Wallace spacing equation in order to measure the fly height of the head over the disk. In one embodiment, writing the fly height pattern to a data segment of a data track enables the control circuitry 26 to write any desired pattern at any desired frequency (or frequencies) in order to facilitate the fly height measurement. For example, FIG. 2D illustrates an embodiment wherein the control circuitry 26 may write a fly height pattern to the disk comprising a frequency that differs from a frequency of the servo preamble in a servo sector. Accordingly in this embodiment the control circuitry 26 may generate the fly height measurement by reading any desired fly height pattern rather than be constrained to the frequency of the servo preamble. In addition, reading the fly height pattern from a data segment allows the cooling effect of the servo sectors on the protrusion fly height profile to be measured at any desired circumferential offset as described above.

In the embodiment described above with reference to FIG. 3A, the control circuitry 26 may measure the protrusion fly height profile by increasing the laser power over a data segment between consecutive servo sectors (at varying write intervals). This embodiment allows the head 22 to cool after terminating the write mode while the disk finishes the current revolution before again increasing the laser power during a subsequent revolution. In another embodiment, the head 22 may cool sufficiently within a partial revolution of the disk, and therefore the control circuitry 26 may make multiple fly height measurements (after different write intervals) during a single revolution of the disk. That is, the control circuitry 26 may read a fly height pattern from different parts of the same data track during a single revolution of the disk in order to expedite measuring the protrusion fly height profile as described above.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

In various embodiments, a disk drive may include a magnetic disk drive, an optical disk drive, etc. In addition, while the above examples concern a disk drive, the various embodiments are not limited to a disk drive and can be applied to other data storage devices and systems, such as magnetic tape drives, solid state drives, hybrid drives, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
a disk comprising a plurality of tracks, where each track comprises a plurality of servo sectors and at least one data segment between consecutive servo sectors;
a head actuated over the disk, the head comprising a laser configured to heat the disk during write operations based on a laser power; and
control circuitry configured during a first revolution of the disk to:
first increase the laser power over a first interval to cause at least part of the head to protrude toward a first data segment of the disk; and
after the first interval, first decrease the laser power and read a fly height pattern from the first data segment to first measure a fly height of the head.

2. The data storage device as recited in claim 1, wherein the increased laser power corresponds to a write laser power.

3. The data storage device as recited in claim 2, wherein the control circuitry is further configured to write data to the first data segment during the first interval.

4. The data storage device as recited in claim 1, wherein the head further comprises a fly height actuator and the control circuitry is further configured to adjust a control signal applied to the fly height actuator in connection with increasing the laser power.

5. The data storage device as recited in claim 1, wherein after first measuring the fly height of the head the control circuitry is further configured to:

second increase the laser power over a second interval different from the first interval to cause at least part of the head to protrude toward a second data segment of the disk; and     after the second interval, second decrease the laser power and read a fly height pattern from the second data segment to second measure a fly height of the head.

6. The data storage device as recited in claim 5, wherein the second data segment comprises the first data segment.

7. The data storage device as recited in claim 5, wherein the control circuitry is further configured to second increase the laser power, second decrease the laser power and second measure the fly height during the first revolution of the disk.

8. The data storage device as recited in claim 5, wherein the control circuitry is further configured to second increase the laser power, second decrease the laser power and second measure the fly height during a second revolution of the disk.

9. The data storage device as recited in claim 5, wherein:

the first measured fly height corresponds to a first data point of a protrusion fly height profile at the beginning of the write operations; and     the second measured fly height corresponds to a second data point of the protrusion fly height profile.

10. The data storage device as recited in claim 1, wherein:

each servo sector comprises a servo preamble recorded at a first frequency; and     the fly height pattern comprises a second frequency different from the first frequency.

11. A method of operating a data storage device, the method comprising during a first revolution of a disk:

first increasing a laser power of a head over a first interval to cause at least part of the head to protrude toward a first data segment between consecutive servo sectors of the disk; and     after the first interval, first decreasing the laser power and reading a fly height pattern from the first data segment to first measure a fly height of the head.

12. The method as recited in claim 11, wherein the increased laser power corresponds to a write laser power.

13. The method as recited in claim 12, further comprising writing data to the first data segment during the first interval.

14. The method as recited in claim 11, further comprising adjusting a control signal applied to a fly height actuator in connection with increasing the laser power.

15. The method as recited in claim 11, wherein after first measuring the fly height of the head the method further comprises:

second increasing the laser power over a second interval different from the first interval to cause at least part of the head to protrude toward a second data segment of the disk; and     after the second interval, second decreasing the laser power and read a fly height pattern from the second data segment to second measure a fly height of the head.

16. The method as recited in claim 15, wherein the second data segment comprises the first data segment.

17. The method as recited in claim 15, further comprising second increasing the laser power, second decreasing the laser power and second measuring the fly height during the first revolution of the disk.

18. The method as recited in claim 15, further comprising second increasing the laser power, second decrease the laser power and second measure the fly height during a second revolution of the disk.

19. The method as recited in claim 15, wherein:

the first measured fly height corresponds to a first data point of a protrusion fly height profile at the beginning of the write operations; and     the second measured fly height corresponds to a second data point of the protrusion fly height profile.

20. The method as recited in claim 11, wherein:

each servo sector comprises a servo preamble recorded at a first frequency; and     the fly height pattern comprises a second frequency different from the first frequency.

\* \* \* \* \*